US010590860B2

(12) United States Patent
Moroto et al.

(10) Patent No.: US 10,590,860 B2
(45) Date of Patent: Mar. 17, 2020

(54) ENGINE LOAD ESTIMATION STRATEGY IN GAS TURBINE ENGINE SYSTEM

(71) Applicant: Solar Turbines Incorporated, San Diego, CA (US)

(72) Inventors: Robert Moroto, Los Angeles, CA (US); Chad Holcomb, San Diego, CA (US)

(73) Assignee: Solar Turbines Incorporated, San Diego, CA (US)

( * ) Notice: Subject to any disclaimer, the term of this patent is extended or adjusted under 35 U.S.C. 154(b) by 446 days.

(21) Appl. No.: 15/487,804

(22) Filed: Apr. 14, 2017

(65) Prior Publication Data

US 2018/0298830 A1    Oct. 18, 2018

(51) Int. Cl.
| | |
|---|---|
| *F02C 9/28* | (2006.01) |
| *F01D 15/10* | (2006.01) |
| *F01D 21/00* | (2006.01) |
| *F02C 9/26* | (2006.01) |
| *H02J 3/14* | (2006.01) |
| *H02J 3/00* | (2006.01) |

(52) U.S. Cl.
CPC .............. *F02C 9/28* (2013.01); *F01D 15/10* (2013.01); *F01D 21/003* (2013.01); *F02C 9/26* (2013.01); *F05D 2260/821* (2013.01); *F05D 2270/05* (2013.01); *F05D 2270/053* (2013.01); *F05D 2270/06* (2013.01); *H02J 3/14* (2013.01); *H02J 2003/003* (2013.01)

(58) Field of Classification Search
CPC .... F02C 9/26; F02C 9/28; F01D 15/10; F01D 21/003; F05D 2260/821; F05D 2270/05; F05D 2270/053; F05D 2270/06; H02J 2003/003; H02J 3/14
See application file for complete search history.

(56) References Cited

U.S. PATENT DOCUMENTS

| | | | | |
|---|---|---|---|---|
| 4,238,924 | A * | 12/1980 | Kanegae | ................... F02C 9/28 60/39.281 |
| 4,349,744 | A | 9/1982 | Reuther et al. | |
| 5,252,860 | A | 10/1993 | McCarty et al. | |
| 5,896,736 | A | 4/1999 | Rajamani | |
| 7,725,236 | B2 * | 5/2010 | Delaloye | ................ F01D 25/18 184/6.1 |
| 8,358,036 | B2 | 1/2013 | Dozier et al. | |
| 2014/0365419 | A1 * | 12/2014 | Salonidis | .................. H02J 3/00 706/52 |

* cited by examiner

*Primary Examiner* — Gerald L Sung
*Assistant Examiner* — James P McGlynn
(74) *Attorney, Agent, or Firm* — Mattingly Burke Cohen & Biederman

(57) ABSTRACT

A gas turbine engine system includes a gas turbine engine and a control system including sensors for monitoring operating properties of the engine, a signaling device that outputs a discrete switching signal indicative of an engine load change, such as connecting or disconnecting an electrical load in an electrical power system powered by the gas turbine engine, and an electronic control unit. The control unit calculates an engine load estimate based upon the switching signal, the operating properties, and statistical information in a recursive statistical estimator.

11 Claims, 3 Drawing Sheets

ENGINE LOAD ESTIMATION STRATEGY IN GAS TURBINE ENGINE SYSTEM

TECHNICAL FIELD

The present disclosure relates generally to estimating engine load in a gas turbine engine system, and relates more particularly to estimating engine load based on a binary signal correlated with an engine load disturbance.

BACKGROUND

Gas turbine engines are well known and widely used for electrical power generation, operating pumps and compressors, in aeronautical applications for thrust, and in still other applications. Control systems governing gas turbine engines receive many types of data from instruments onboard the gas turbine engine, and others coupled with equipment that is powered by the gas turbine engine. Operating properties in the nature of compressor discharge pressure, shaft speed, firing temperature, and still others relating to operation of the gas turbine engine are typically monitored. Electrical output of an electrical generator coupled with a gas turbine engine is also commonly monitored for various purposes. Due to the complexity of the machinery, the relatively harsh operating conditions, and an environment associated with significant signal noise, gas turbine engine control systems can be quite complex.

In one conventional strategy for controlling a gas turbine engine, data from onboard instruments such as temperature and shaft speed sensors is gathered, and a desired fueling rate determined according to a suitable control law in a closed loop fashion. While such conventional techniques have been suitable in certain engine systems for many years, when an engine load of the gas turbine engine changes, there is by necessity some delay in the ability of conventional control systems to observe and compensate for the engine load change. This is due to the fact that the response of engine process variables to an engine load change is not instantaneous, nor is the signal processing that is necessary to reliably observe the response. For instance, it has long been observed that when a gas turbine engine experiences a relatively sudden engine load change or transient, the shaft speed of the gas turbine engine, as well as other operating properties, will change in response. The control system will eventually react to the speed change and increase or decrease fueling, but typically not before the speed has increased or decreased to a greater extent or for a greater length of time than is considered optimal. Such excursions, commonly accompanied by fluctuations, in speed and various other parameters are undesired from the standpoint of efficiency and for other reasons.

U.S. Pat. No. 4,349,744 to Reuther et al. is directed to a system for operating multiple gas turbines for a coordinated dead load pickup, and discloses a specialized mode of operation where one turbine-generator is controlled as a lead unit, and operated in conjunction with the operation of a synchronized turbine-generator, with each connected to an auxiliary bus. The two units can then together be used for a load pickup from the bus, presumably to provide for a desired pattern of load sharing between the turbine-generator units. Reuther et al. may have provided some improvements as to how large load transients are shared among turbine-generator units. There remains ample room for other developments, however, respecting the monitoring and management of load transients on and among gas turbine engines.

SUMMARY OF THE INVENTION

In one aspect, a method of operating a gas turbine engine system including a gas turbine engine coupled with an electrical generator in an electrical power system includes, receiving data of a plurality of operating properties of the gas turbine engine system that together vary in a manner dependent upon a power output of the gas turbine engine. The method further includes receiving a switching signal indicative of switching the gas turbine engine system from a first state where the gas turbine engine powers a first set of a plurality of electrical loads in the electrical power system, to a second state where the gas turbine engine powers a second set of the plurality of electrical loads in the electrical power system. The method further includes calculating an engine load estimate for the gas turbine engine based on the data of the plurality of operating properties, a statistical value indicative of an average engine load change from the first state to the second state, and a dispersion value indicative of expected variability in the engine load change from the first state to the second state. The method further includes outputting a fueling command for the gas turbine engine that is based on the engine load estimate.

In another aspect, a gas turbine engine system includes a gas turbine engine structured to operate an electrical generator in an electrical power system, and a control system. The control system includes a plurality of sensing mechanisms structured to produce data indicative of a plurality of operating properties of the gas turbine engine that together vary dependent upon a power output of the gas turbine engine. The control system further includes a signaling device structured to output a switching signal indicative of switching the gas turbine engine from a first state where the gas turbine engine powers a first set of a plurality of electrical loads in the electrical power system, to a second state where the gas turbine engine powers a second set of the plurality of electrical loads in the electrical power system. The control system further includes an electronic control unit coupled with each of the plurality of sensing mechanisms and the signaling device, and structured to output an engine load signal that is based on the data of the plurality of operating properties, a statistical value indicative of an average engine load change from the first state to the second state, and a dispersion value indicative of expected variability in the engine load change from the first state to the second state.

In still another aspect, a control system for a gas turbine engine system includes a plurality of sensing mechanisms structured to produce data indicative of a plurality of operating properties of the gas turbine engine system that together vary dependent upon a power output of a gas turbine engine therein. The control system further includes a signaling device structured to output a switching signal indicative of switching the gas turbine engine from a first state where the gas turbine engine powers a first set of a plurality of electrical loads in an electrical power system, to a second state where the gas turbine engine powers a second set of the plurality of electrical loads in the electrical power system. The control system further includes an electronic control unit coupled with each of the plurality of sensing mechanisms and the signaling device. The electronic control unit is structured to calculate an engine load estimate and output an engine load signal that is based on the engine load estimate. The engine load estimate is based on the data of the plurality of operating properties, a statistical value indicative of an average engine load change from the first state to the second state, and a dispersion value indicative of expected variability in the engine load change.

DETAILED DESCRIPTION

Figure 1:
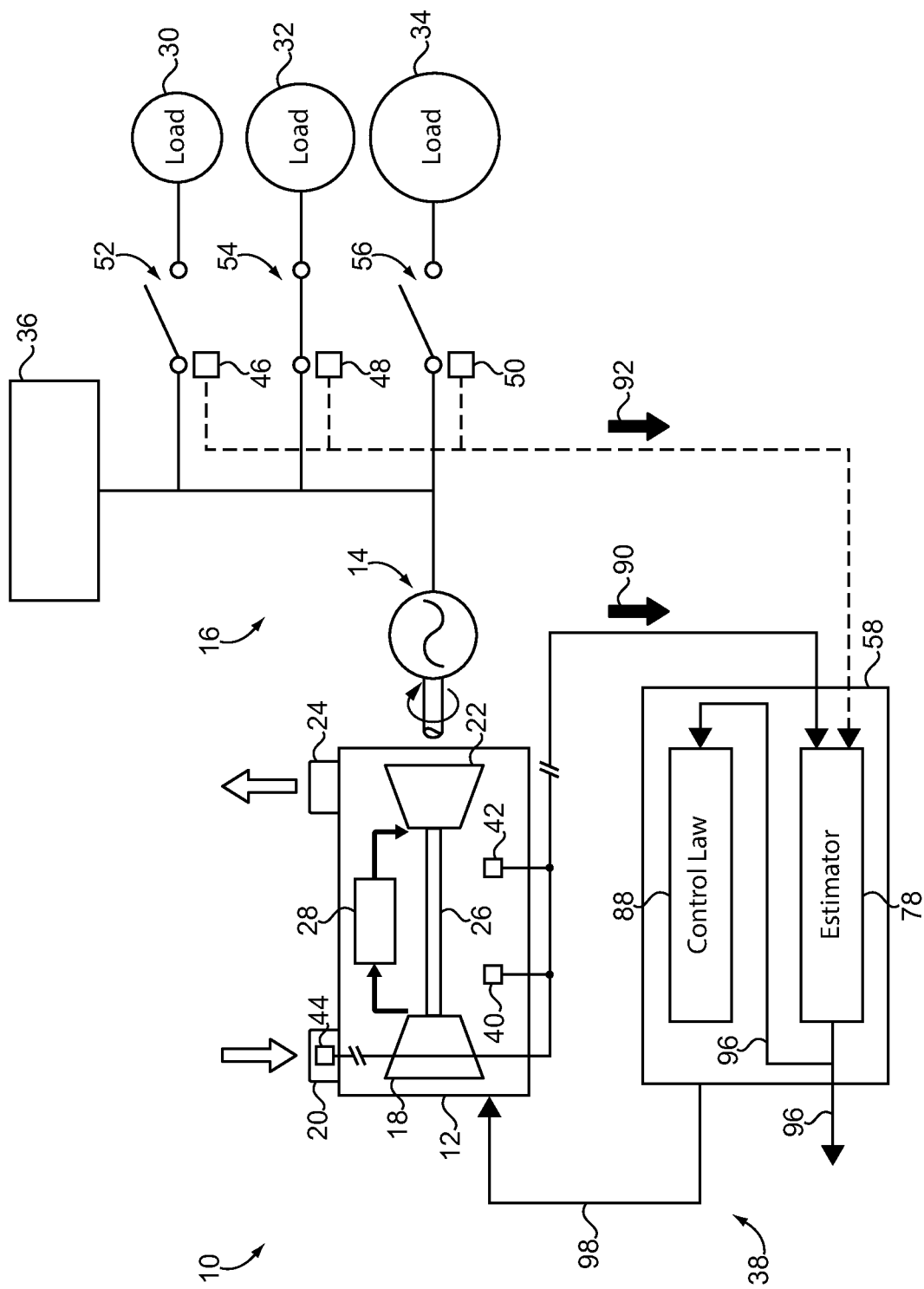
FIG. 1 is a diagrammatic view of gas turbine engine and electrical power systems, according to one embodiment.

Referring to FIG. 1, there is shown a gas turbine engine system 10 (hereinafter "engine system 10") including a gas turbine engine 12 coupled with an electrical generator 14 in an electrical power system 16. Gas turbine engine 12 includes a compressor 18 structured to receive air for compression by way of an inlet 20, and coupled with a turbine 22 by way of a shaft 26. Turbine 22 is rotated by way of a flow of combustion gases from a combustor 28, and discharges exhaust out of an outlet 24 in a generally conventional manner. Rotation of turbine 22 can rotate a rotor in generator 14 to produce electricity for electrical power system 16 in a generally conventional manner. For purposes of the present disclosure, generator 14 can be understood as a part of gas turbine engine system 10, or as a part of electrical power system 16. Electrical power system 16 is coupled with or includes a plurality of electrical loads 30, 32, and 34. In the illustrated embodiment, three electrical loads are shown, along with additional equipment 36 of electrical power system 16 that might also be electrically powered. At any given time gas turbine engine 12 may operate to power one, two, three, or more electrical loads in electrical power system 16. Those skilled in the art will appreciate that an engine load of gas turbine engine 12 may vary depending upon which of loads 30, 32, and 34 gas turbine engine 12 is operating to power.

In the illustrated embodiment, each of loads 30, 32, and 34 is coupled with electrical generator 14 by way of a breaker 52, 54, and 56, respectively. At the state depicted in FIG. 1, breaker 54 is shown in a closed configuration electrically connecting load 32 with electrical generator 14. Breaker 52 and breaker 56 are shown in open configurations. Engine system 10 can be understood to be in a first state where gas turbine engine 12 is operating to power a first set of the plurality of electrical loads 30, 32, and 34. Electrical power system 16 can be adjusted by opening or closing one or more of breakers 52, 54, and 56 such that gas turbine engine system 10 is understood to transition or switch to a second state where gas turbine engine 12 powers a second set of electrical loads 30, 32, and 34. Engine system 10 can further be transitioned or switched to a third state, a fourth state, or any number of other states depending upon the number and arrangement of electrical loads in electrical power system 16, and in each of these different states powering a different set of the plurality of electrical loads. Engine system 10 may also operate to power all of the electrical loads in electrical power system 16 depending on the architecture thereof.

While only a single gas turbine engine 12 is shown in FIG. 1, in other embodiments multiple gas turbine engines might be used, one or more of which are operating at any given time to compensate for power demands in electrical power system 16. While engine system 10 may be configured for operation in island mode, electrical power system 16 may also be structured for connection to a municipal or industrial electrical power grid. Equipment 36 might be or be coupled with a power grid, with the power grid including its own electrical power supply. Those skilled in the art will further appreciate that engine system 10 may operate at a different engine load at most or all of the different states that vary dependent upon open or closed configurations of breakers 52, 54, and 56, or other conditions that vary or require varying power output. As will be further apparent from the following description, engine system 10 is uniquely configured for engine load monitoring and estimation, as well as taking action upon engine load monitoring and estimation, in a manner that may be faster and more accurate than conventional techniques.

Engine system 10 further includes a control system 38 including a plurality of sensing mechanisms 40, 42, and 44 structured to produce data indicative of a plurality of operating properties of gas turbine engine 12. The operating properties together vary dependent upon a power output of gas turbine engine 12, and can include firing temperature, compressor outlet pressure, exhaust temperature, shaft speed, and additional operating properties known to vary with varying of a power output of gas turbine engine 12. For example, sensing mechanism or sensor 42 could include a sensor structured to monitor a speed of shaft 26. Sensing mechanism or sensor 40 could include a sensor structured to monitor a pressure of air after compressing by way of compressor 18. Sensing mechanism or sensor 44 could include an intake air mass flow sensor. Additional sensors (not shown) could be coupled with generator 14, and output generator voltage and generator current signals known to together vary dependent upon an electrical power output of generator 14, which is in turn coupled with a power output of gas turbine engine 12. Sensing mechanisms 40, 42, and 44, and such other sensing mechanisms as may be used, may produce continuous or substantially continuous analog signals that together vary with power output and engine load of gas turbine engine 12. Certain conventional strategies relied for load determination upon sensing strategies exploiting these and other analog sensor outputs. As further discussed herein, the present disclosure provides for exploiting sensor data supplemented with information as to discrete phenomena communicated by way of digital logic signals.

Control system 38 further includes one or more signaling devices 46, 48, and 50 structured to output a switching signal indicative of switching gas turbine engine system 10 between a first state as described herein where gas turbine engine 12 powers a first set of loads 30, 32, and 34, and the second state where gas turbine engine 12 powers a second set of loads 30, 32, and 34. In an implementation, signaling devices 46, 48, and 50 could include mechanical breaker position sensors or electrical current or voltage sensors, structured to produce a discrete signal having a positive sign where the corresponding breaker 52, 54, or 56 is positioned in one of an open state or a closed state, and a discrete signal having a negative sign where the corresponding breaker 52, 54, or 56 is positioned in the other of an open state or a closed state. Where breaker 56 is opened, signaling device 50 may produce a value=−1, where breaker 56 is closed, signaling device 50 may produce a value=+1. At nonswitching times, no signal may be produced, which can be interpreted for control purposes as further discussed herein, as a value=0.

Control system 38 further includes an electronic control unit 58 coupled with each of sensing mechanisms 40, 42, and 44 and signaling devices 46, 48, and 50. Electronic control unit 58 may include any suitable programmable computer control unit, including a data processor and memory storing computer executable program instructions. Electronic control unit 58 could include a field programmable gate array (FPGA), an application specific integrated circuit (ASIC), or still another device. Electronic control unit 58 may further include an estimator 78 and a control or control law 88, as further discussed herein. Electronic control unit 58 receives a switching signal 92 from one or more of signaling devices 46, 48, and 50, and receives analog sensor signals 90 from one or more of sensors 40, 42, and 44. It will be recalled that signals 90 may be continuous signals indicative of speed, temperature, pressure or potentially other properties, whereas signal 92 is a discrete, digital signal. Electronic control unit 58 is further structured to calculate an engine load estimate by way of estimator 78, and output an engine load signal 96 that is based on the calculated engine load estimate. Engine load signal 96 is based on the data of the plurality of operating properties, a statistical value indicative of an average engine load change between the first state and the second state, and a dispersion value indicative of an expected variability in the engine load change. According to control law 88, electronic control unit 58 produces a fueling command 98 for gas turbine engine 12 that is based on the engine load estimate indicated by engine load signal 96.

Those skilled in the art will appreciate that an increased engine load can be compensated by increasing a fueling rate of gas turbine engine 12, whereas a decreased engine load can be compensated by decreasing a fueling rate of gas turbine engine 12. It will further be recalled that the breaker status signal 92 may have a positive sign when the corresponding breaker closes or opens and a negative sign when the corresponding breaker does the other of closing or opening. From this relationship, it can be seen that fueling can be increased where an increase in engine load is expected based on connecting an electrical load in electrical power system 16 with electrical generator 14. Analogously, fueling can be decreased where a decrease in engine load is expected where an electrical load in electrical power system 16 is disconnected from electrical generator 14.

Examples of scenarios where relatively large electrical loads are connected to electrical generator 14 or disconnected from electrical generator 14 will be readily contemplated. For example, a large refrigerator or large electrical heater in an institutional or industrial setting might be periodically connected to electrical generator 14 by closing one of breakers 46, 48, and 50. That relatively large electrical load could also be disconnected by opening the one of breakers 52, 54, and 56. Electrically powered drills, conveyors, pumps, and virtually innumerable other machines and the like are example electrical loads that can be connected or disconnected from an electrical generator to switch a gas turbine engine between a first state powering a first set of electrical loads and a second state powering a second set of electrical loads in the context contemplated herein.

In other instances, a load change that switches gas turbine engine system 10 between a first state and a second state could result from connecting another electrical generator to electrical power system 16, increasing or decreasing an electrical power output of that other electrical generator, or potentially connecting or disconnecting electrical power system 16 from an electrical power grid serviced by other electrical power production facilities. Signal 92 could thus include a discrete signal from another engine system or electrical generator, from switchgear connecting a microgrid of which gas turbine engine system 10 is a part to a utility power grid, or any other discrete signal having a known relationship with a change in engine load of gas turbine engine 12.

Figure 2:
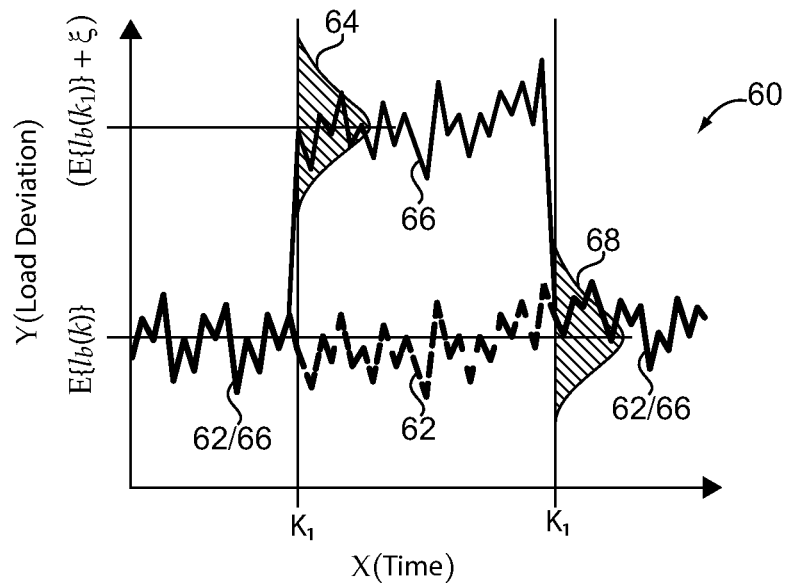
FIG. 2 is a graph illustrating engine load deviation over time.

As noted above, the engine load estimate calculated in estimator 76 is based on the data of the plurality of operating properties, a statistical value indicative of an average engine load change between the first state and the second state, and a dispersion value indicative of an expected variability in the engine load change. Referring also now to FIG. 2, there is shown a graph illustrating load deviation on the Y-axis, and time on the X-axis. Prior to a time $k_1$, a base load signal 62 and a total load deviation signal 66 are overlapping. At time $k_1$, a breaker closing signal, for example, is received, and the total load deviation signal 66 increases. At a time $k_2$, a breaker opening signal, for example, is received and the total load deviation signal 66 decreases, such that signal 62 and signal 66 begin to again overlap. In an implementation, a statistical value is used in estimator 78 to increase a base load value indicated by the base load signal 62 at time $k_1$, and a statistical value is used at estimator 78 to decrease the engine load estimate at time $k_2$. The statistical value may include a numerical mean value of the engine load change between the first state and the second state. In other implementations, the statistical value could be another value that is indicative of an average engine load change between the first state and the second state, such as a median value, a mode value, or some other statistical value that is indicative of a central tendency. The dispersion value can be a numerical value such as a variance. In FIG. 2, reference numeral 64 identifies a probability density function associated with the engine load increase at time $k_1$, whereas reference numeral 68 identifies a probability density function associated with the engine load change at time $k_2$. It will be noted that probability density function 64 and probability density function 68 are each associated with Gaussian distribution. The statistical value that the increase or decrease in engine load value indicated by the base load signal is based on can be developed in a number of different ways. It is contemplated that an empirical determination can be employed in many instances. For example, engine load can be determined by way of generally known techniques such as the analog sensing techniques discussed herein, while gas turbine engine system 10 and electrical power system 16 are switched among all of the various possible states, and data gathered as to the engine load changes that are observed. The engine load observations can be used to determine a plurality of different statistical values that are used in estimator 78, depending upon which of each of the possible transitions among states of gas turbine engine system 10 has occurred. Likewise, the dispersion value can be empirically determined based on a variance observed over the course of a plurality of repetitions of switching gas turbine engine 10 between states.

In an implementation, a base load value indicated by the base load signal 62 is increased or decreased, depending upon a sign of signal 92, based on the statistical value, in a recursive statistical estimator. A Kalman filter may be executed in estimator 78, although the present disclosure is not thereby limited and any suitable recursive statistical estimator can be used. It will be appreciated that using a recursive statistical estimator algorithm will typically include recalculating the engine load estimate. At a steady state, the variance can be expected to decrease, with increased confidence as to the accuracy of the engine load estimate over the course of multiple calculations. At or just prior to time $k_1$ when signal 92 is received, the engine load estimate calculation can be understood to occur at an earlier time. An updated engine load estimate can be calculated at a later time based on additional data of the plurality of operating properties, the statistical value, and an updated dispersion value associated with increased confidence in the accuracy of the calculated engine load estimate over time.

INDUSTRIAL APPLICABILITY

Figure 3:
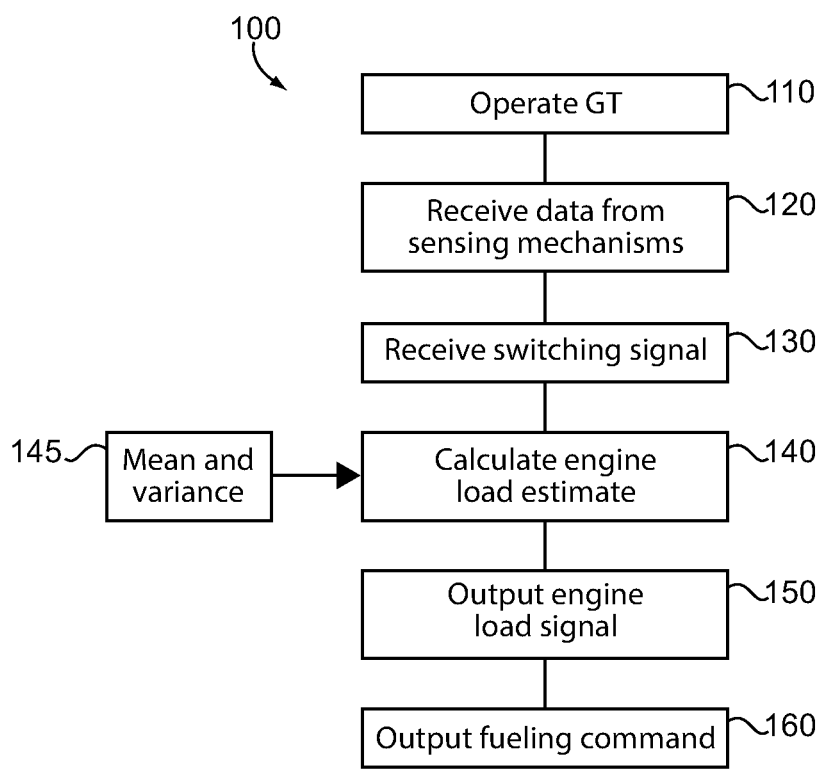
FIG. 3 is a flowchart illustrating example process and control logic flow, according to one embodiment.

Referring also now to FIG. 3, there is shown a flowchart 100 illustrating example control logic flow, where gas turbine engine system 10 is operated at a block 110. From block 110, the process advances to block 120 to receive data from the plurality of sensing mechanisms, and thenceforth to block 130 to receive a switching signal as discussed herein. From block 130, the process advances to block 140 to calculate the engine load estimate. Mean and variance values are inputted by way of a block 145. It will be appreciated that a different mean value and different variance values will be provided depending upon which breaker 52, 54, or 56 is closed or opened. In some instances, more than one breaker may be closed or opened at a time, or one breaker can be opened and another closed. Different statistical values and dispersion values would be associated with the various different combinations of breaker opening and/or closing. From block 140, the process advances to block 150 to output engine load signal 96. From block 150, the process advances to block 160 to output fueling command 98.

Figure 4:
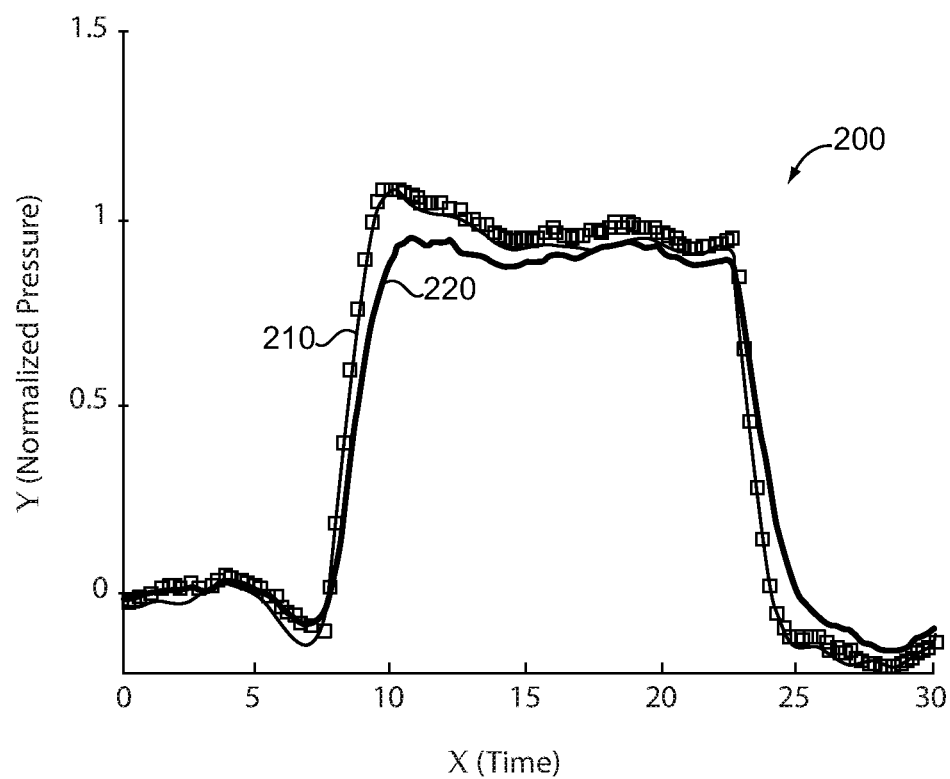
FIG. 4 is a graph illustrating normalized compressor outlet pressure determinations over time according to the present disclosure in comparison to another strategy.

Turning to FIG. 4, there is shown normalized compressor outlet pressure on the Y-axis, in comparison to time on the X-axis, as might be observed in a gas turbine engine system operated according to the present disclosure in comparison with a gas turbine engine system operated according to conventional techniques. It will be appreciated that while fueling control is a practical advantage of the teachings set forth herein, various process variables relating to gas turbine engine operation can be advantageously determined and monitored according to the present disclosure for various diagnostic, modeling and control purposes. In particular, in FIG. 4, a breaker-informed signal 210 is shown in comparison with a breaker-uninformed signal 220. Breaker-informed signal 210 can be produced on the basis of an engine load estimate calculated according to the present disclosure, whereas breaker-uninformed signal 220 is conventionally produced, such as on the basis of analog sensor signals alone.

It will be recalled that operating properties that vary dependent upon a power output of a gas turbine engine, which can include compressor outlet pressure, are typically only observed after an engine load transient occurs. In other words, the detection of a compressor outlet pressure change may be delayed from the time at which that change actually occurs due to processing time. In FIG. 4, it can be seen that breaker-informed signal 210 is indicative of a compressor outlet pressure change at a relatively earlier point in time, and shows a relatively greater increase. Still other properties of gas turbine engine operation could be expected to also exhibit reduced time of detection and improved accuracy by application of the techniques set forth herein.

The present description is for illustrative purposes only, and should not be construed to narrow the breadth of the present disclosure in any way. Thus, those skilled in the art will appreciate that various modifications might be made to the presently disclosed embodiments without departing from the full and fair scope and spirit of the present disclosure. For example, rather than or in addition to a fueling command produced on the basis of the engine load signal, other turbine load regulation commands such as an airflow command to adjust variable guide vanes or a bleed valve could be produced. Other aspects, features and advantages will be apparent upon an examination of the attached drawings and appended claims. As used herein, the articles "a" and "an" are intended to include one or more items, and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A gas turbine engine system comprising:
   a gas turbine engine structured to operate an electrical generator in an electrical power system;
   a control system including a plurality of sensing mechanisms structured to produce data indicative of a plurality of operating properties of the gas turbine engine system that together vary dependent upon a power output of the gas turbine engine;
   the control system further including a signaling device structured to output a switching signal indicative of switching the gas turbine engine from a first state where the gas turbine engine powers a first set of a plurality of electrical loads in the electrical power system, to a second state where the gas turbine engine powers a second set of the plurality of electrical loads in the electrical power system; and
   the control system further including an electronic control unit coupled with each of the plurality of sensing mechanisms and the signaling device, and structured to output an engine load signal that is based on the data of the plurality of operating properties, a statistical value indicative of an average engine load change from the first state to the second state, and a dispersion value indicative of an expected variability in engine load change from the first state to the second state.

2. The system of claim 1 wherein the signaling device includes a breaker sensor structured to couple with an electrical breaker in the electrical power system, and to produce a switching signal having a first sign where the electrical breaker is in a closed state, and to produce a switching signal having a second sign where the electrical breaker is in an open state.

3. The system of claim 2 wherein the statistical value includes a mean value of the engine load change from the first state to the second state.

4. The system of claim 1 wherein the switching signal includes a discrete signal.

5. The system of claim 4 wherein the electronic control unit is further structured to produce a base load signal based on the data of the plurality of operating parameters.

6. The system of claim 5 wherein the electronic control unit is further structured to calculate the engine load estimate by way of increasing or decreasing a base load value indicated by the base load signal based on the statistical value, in a recursive statistical estimator.

7. The system of claim 6 wherein the electronic control unit is further structured to output a turbine load regulation command to the gas turbine engine based on the engine load signal.

8. A control system for a gas turbine engine system comprising:
- a plurality of sensing mechanisms structured to produce data indicative of a plurality of operating properties of the gas turbine engine system that together vary dependent upon a power output of a gas turbine engine therein;
- a signaling device structured to output a switching signal indicative of switching the gas turbine engine from a first state where the gas turbine engine powers a first set of a plurality of electrical loads in an electrical power system, to a second state where the gas turbine engine powers a second set of the plurality of electrical loads in the electrical power system;
- an electronic control unit coupled with each of the plurality of sensing mechanisms and the signaling device; and
- the electronic control unit being structured to calculate an engine load estimate and output an engine load signal that is based on the engine load estimate, and wherein the engine load estimate is based on the data of the plurality of operating properties, a statistical value indicative of an average engine load change from the first state to the second state, and a dispersion value indicative of an expected variability in engine load change from the first state to the second state.

9. The control system of claim 8 wherein the electronic control unit is further structured to output a base load signal, wherein the statistical value includes a mean value of the engine load change between the first state and the second state, and wherein the electronic control unit is programmed to calculate the engine load estimate by way of increasing or decreasing a base load value indicated by the base load signal, based on the statistical value, in a recursive statistical estimator.

10. The control system of claim 8 wherein the signaling device includes a breaker sensor structured to couple with an electrical breaker in the electrical power system, and to produce a switching signal having a first sign where the electrical breaker is in a closed state, and to produce a switching signal having a second sign where the electrical breaker is in an open state.

11. The control system of claim 8 wherein the electronic control unit further includes a fuel control structured to output a fueling command for the gas turbine engine based on the engine load estimate.

* * * * *